United States Patent [19]

Chandra et al.

[11] Patent Number: 4,806,612

[45] Date of Patent: Feb. 21, 1989

[54] PRECERAMIC ACETYLENIC POLYSILANES

[75] Inventors: Grish Chandra; Gregg A. Zank, both of Midland, Mich.

[73] Assignee: Dow Corning Corporation, Midland, Mich.

[21] Appl. No.: 83,121

[22] Filed: Aug. 10, 1987

[51] Int. Cl.$^4$ .............................................. C08G 77/00
[52] U.S. Cl. ..................................... 528/10; 556/430; 556/478; 556/480; 501/88; 501/97; 501/92
[58] Field of Search ................... 528/10; 556/430, 478, 556/480

[56] References Cited

U.S. PATENT DOCUMENTS

| | | | |
|---|---|---|---|
| Re. 31,447 | 2/1982 | Baney et al. | 264/65 |
| 2,554,976 | 5/1951 | Burkhard | 556/430 |
| 4,260,780 | 4/1981 | West | 556/430 |
| 4,298,559 | 11/1981 | Baney et al. | 264/65 |
| 4,310,651 | 1/1982 | Baney et al. | 528/21 |
| 4,314,956 | 2/1982 | Baney et al. | 264/65 |
| 4,639,501 | 1/1987 | Seyferth | 528/15 |

OTHER PUBLICATIONS

Baney, et al; "Methylchloropolysilane & Derivatives Prepared from the Redistribution of Methylchlorodisilanes"; 1983, 2, 859; Organometallics.

West, et al; "Polysilane High Polymers as Precursors to Silicon Carbide"; (1984), 25, 4, ;POLYM. PREPR.

Primary Examiner—Melvyn I. Marquis
Attorney, Agent, or Firm—James E. Bittell

[57] ABSTRACT

Preceramic actylenic polysilanes are described which contain $-(CH_2)_wC\equiv CR'$ groups attached to silicon where w is an integer from 0 to 3 and where R' is hydrogen, an alkyl radical containing 1 to 6 carbon atoms, a phenyl radical, or an $-SiR'''_3$ radical wherein R''' is an alkyl radical containing 1 to 4 carbon atoms. The acetylenic polysilanes are prepared by reacting chlorine- or bromine-containing polysilanes with either a Grignard reagent of general formula $R'C\equiv C(CH_2)_wMgX'$ where w is an integer from 0 to 3 and X' is chlorine, bromine, or iodine or an organolithium compound of general formula $R'C\equiv C(CH_2)_wLi$ where w is an integer from 0 to 3. The acetylenic polysilanes can be converted to ceramic materials by pyrolysis at elevated temperatures under an inert atmosphere.

43 Claims, No Drawings

PRECERAMIC ACETYLENIC POLYSILANES

BACKGROUND OF THE INVENTION

This invention relates to acetylenic polysilanes composed of [RSi] and [R$_2$Si] units where there are present 0 to 60 mole percent [R$_2$Si] units and 40 to 100 mole percent [RSi] units and to acetylenic polysilanes composed of [RSi], [R$_2$Si], and [R"Si] units where there are present 0 to 40 mole percent [R$_2$Si] units, 0.1 to 99.9 mole percent [RSi] units, and 0.1 to 99.9 mole percent [R"Si] units, where R is an alkyl radical containing 1 to 8 carbon atoms, where R" is selected from the group consisting of alkyl radical containing at least six carbon atoms, phenyl radicals, and radicals of the formula A$_3$Si(CH$_2$)$_z$— wherein A is selected from the group consisting of hydrogen and alkyl radicals containing 1 to 4 carbon atoms, and z is an integer greater than or equal to 1, and where the remaining bonds on silicon are attached to other silicon atoms and acetylenic groups of the formula —(CH$_2$)$_w$C≡CR' where w is an integer from 0 to 3 and where R' is hydrogen, an alkyl radical containing 1 to 6 carbon atoms, a phenyl radical, or an —SiR'''$_3$ radical wherein R''' is an alkyl radical containing 1 to 4 carbon radicals. These acetylenic polysilanes are prepared by reacting a halogen-containing polysilane composed of [RSi] and [R$_2$Si] units, where there are present 0 to 60 mole percent [R$_2$Si] units and 40 to 100 mole percent [RSi] units, or a halogen-containing polysilane composed of [RSi], [R$_2$Si], and [R"Si] units, where there are present 0 to 40 mole percent [R$_2$Si] units, 0.1 to 99.9 mole percent [RSi] units, and 0.1 to 99.9 mole percent [R"Si] units, with an acetylenic Grignard reagent or acetylenic lithium compound.

The acetylenic polysilanes of this invention may be rendered infusible by reaction with certain organometallic compounds under an inert atmosphere or by exposure to UV irradiation in an inert atmosphere prior to pyrolysis to form ceramic materials. Such cure mechanisms can result in ceramic materials containing only limited amounts of oxygen.

Bujalski et al. in two copending U.S. patent applications entitled "A Method of Producing Silicon Carbide Preceramic Vinyl-containing Polymers" Ser. No. 94,347 and "An Improved Method of Producing Silicon Carbide Preceramic Vinyl-containing Polymers" Ser. No. 93,434 describe vinyl-containing polysilanes which can be converted into ceramic materials by pyrolysis at elevated temperatures.

Baney et al. in U.S. Pat. No. 4,310,651 (issued Jan. 12, 1982) disclosed polysilanes composed of [CH$_3$Si] and [(CH$_3$)$_2$Si] units where there was present 0 to 60 mole percent [(CH$_3$)$_2$Si] units and 40 to 100 mole percent [CH$_3$Si] units and where the remaining bonds on silicon were attached to other silicon atoms and chlorine atoms or bromine atoms. The polysilane was converted to a beta-silicon carbide-containing ceramic at elevated temperatures (about 1400° C.).

Baney et al. in U.S. Pat. No. 4,298,559 (issued Nov. 3, 1981) prepared polysilanes composed of [CH$_3$Si] and [(CH$_3$)$_2$Si] units where there was present 0 to 60 mole percent [(CH$_3$)$_2$Si] units and 40 to 100 mole percent [CH$_3$Si] units and where the remaining bonds on silicon were attached to other silicon atoms and additional alkyl radicals of 1 to 4 carbon atoms or phenyl radicals. Upon heating these polysilanes were converted into silicon carbide-containing ceramics in high yields.

Baney et al. in U.S. Pat. No. Re. 31,447 (reissued Nov. 22, 1983) disclosed polysilanes composed of (CH$_3$Si] and [(CH$_3$)$_2$Si] units where there was present 0 to 60 mole percent [(CH$_3$)$_2$Si] units and 40 to 100 mole percent [CH$_3$Si] units and where the remaining bonds on silicon were attached to other silicon atoms and alkoxy radicals containing 1 to 4 carbon atoms or phenoxy radicals. Silicon carbide ceramics were obtained by firing these polysilanes to elevated temperatures.

Baney et al. in U.S. Pat. No. 4,314,956 (issued Feb. 9, 1982) disclosed polysilanes composed of [CH$_3$Si] and [(CH$_3$)$_2$Si] units where there was present 0 to 60 mole percent [(CH$_3$)$_2$Si] units and 40 to 100 mole percent [CH$_3$Si] units and where the remaining bonds on silicon were attached to silicon and amine radicals of the general formula —NHR$^v$ where R$^v$ is a hydrogen atom, an alkyl radical of 1 to 4 carbon atoms or a phenyl radical. A silicon carbide ceramic was obtained by firing this polysilane to an elevated temperature under an inert atmosphere.

The just discussed U.S. Pat. Nos. 4,310,651, 4,298,599, Re. 31,447, and 4,314,956 are hereby incorporated by reference. These polysilanes are further discussed in Baney et al. *Organometallics*, 2, 859 (1983).

West in U.S. Pat. No. 4,260,780 (issued Apr. 7, 1981) prepared a polysilane composed of [(CH$_3$)$_2$Si] and [CH$_3$(C$_6$H$_5$)Si] units by the sodium metal reduction of dimethyldichlorosilane and methylphenyldichlorosilane. The resulting polysilanes had very high softening points (>280° C.).

West et al. in *Polym. Prepr.*, 25, 4 (1984) disclosed the preparation of a polysilane composed of [CH$_3$(CH$_2$=CHCH$_2$)Si] and [CH$_3$(C$_6$H$_5$)Si] units by the sodium metal reduction of allylmethyldichlorosilane and methylphenyldichlorosilane. These polysilanes were rapidly gelled by irradiation with ultraviolet irradiation.

Seyferth et al. in U.S. Pat. No. 4,639,501 (issued Jan. 27, 1987) prepared preceramic polymers by reacting a methylpolysilane of the general formula [(RSiH)$_x$(RSi)$_y$]$_n$ with an organosilicon compound having at least two vinyl groups of the general formula [R$_2$(CH$_2$=CH)Si]$_2$Y, where, for example, Y is O, S, NH, NR, or is absent, using either UV irradiation, thermal energy, or catalysts.

It has now been determined that polysilanes composed of [RSi] and [R$_2$Si] units or polysilanes composed of [RSi], [R$_2$Si], and [R"Si] units which contain acetylenic groups may be prepared in good yield. The presence of acetylenic groups in the polysilanes is confirmed experimentally. These acetylenic polysilanes may be pyrolyzed at elevated temperatures in an inert atmosphere to produce silicon carbide-containing ceramics. The acetylenic polysilanes may be cured, and thus rendered infusible, prior to pyrolysis either by reaction with certain organometallic compounds or by exposure to ultraviolet irradiation.

THE INVENTION

This invention relates to acetylenic polysilanes composed of [RSi] and [R$_2$Si] units where there are present 0 to 60 mole percent [R$_2$Si] units and 40 to 100 mole percent [RSi] units, where R is an alkyl radical containing 1 to 8 carbon atoms, and where the remaining bonds on silicon are attached to other silicon atoms and acetylenic groups of the formula —(CH$_2$)$_w$C≡CR' where w is an integer from 0 to 3 and where R' is hydrogen, an alkyl radical containing 1 to 6 carbon atoms, a phenyl radical, or an —SiR'''₃ radical wherein R''' is an alkyl radical containing 1 to 4 carbon atoms.

This invention also relates to acetylenic polysilanes composed of [RSi], [R₂Si], and [R''Si] units where there are present 0 to 40 mole percent [R₂Si] units, 0.1 to 99.9 mole percent [RSi] units, and 0.1 to 99.9 mole percent [R''Si] units; where R is an alkyl radical containing 1 to 8 carbon atoms; where R'' is selected from the group consisting of alkyl radicals containing at least six carbon atoms, phenyl radicals, and radicals of the formula A₃Si(CH₂)$_z$— wherein A is selected from the group consisting of hydrogen and alkyl radicals containing 1 to 4 carbon atoms, and z is an integer greater than or equal to 1; and where the remaining bonds on silicon are attached to other silicon atoms and acetylenic groups of the formula —(CH₂)$_w$C≡CR' where w is an integer from 0 to 3 and where R' is hydrogen, an alkyl radical containing 1 to 6 carbon atoms, a phenyl radical, or an —SiR'''₃ radical wherein R''' is an alkyl radical containing 1 to 4 carbon atoms.

This invention also relates to a method of preparing an acetylenic polysilane composed of [RSi] and [R₂Si] units which contains from 0 to 60 mole percent [R₂Si] units and 40 to 100 mole percent [RSi] units, where R is an alkyl radical containing 1 to 8 carbons atoms and where the remaining bonds on silicon are attached to other silicon atoms and acetylenic groups of the formula —(CH₂)$_w$C° C.R' where w is an integer from 0 to 3 and where R' is hydrogen, an alkyl radical containing 1 to 6 carbon atoms, a phenyl radical, or an —SiR'''₃ radical wherein R''' is an alkyl radical containing 1 to 4 carbon atoms, said method consisting of reacting under anhydrous conditions in the presence of a solvent a chlorine- or bromine-containing polysilane composed of [RSi] and [R₂Si] units which contains 0 to 60 mole percent [R₂Si] units and 40 to 100 mole percent [RSi] units where R is an alkyl radical containing 1 to 8 carbon atoms and where the remaining bonds on silicon are attached to other silicon atoms and chlorine or bromine atoms with an acetylenic Grignard reagent of general formula R'C≡C(CH₂)$_w$MgX' or an acetylenic lithium compound of general formula R'C≡C(CH₂)$_w$Li where w is an integer from 0 to 3, R' is hydrogen, an alkyl radical containing 1 to 6 carbon atoms, a phenyl radical, or an —SiR'''₃ radical wherein R''' is an alkyl radical containing 1 to 4 carbon atoms, and X' is chlorine, bromine, or iodine, at a temperature of 0° to 120° C. and thereafter removing the solvent to obtain the acetylenic polysilane.

This invention also relates to a method of preparing an acetylenic polysilane composed of [RSi], [R₂Si], and [R''Si] units which contains from 0 to 40 mole percent [R₂Si] units, 0.1 to 99.9 mole percent [RSi] units, and 0.1 to 99.9 mole percent [R''Si] units where R is an alkyl radical containing 1 to 8 carbons atoms and where the remaining bonds on silicon are attached to other silicon atoms and acetylenic groups of the formula —(CH₂)$_w$C≡CR' where w is an integer from 0 to 3 and where R' is hydrogen, an alkyl radical containing 1 to 6 carbon atoms, a phenyl radical, or an —SiR'''₃ radical wherein R''' is an alkyl radical containing 1 to 4 carbon atoms, said method consisting of reacting under anhydrous conditions in the presence of a solvent a chlorine- or bromine-containing polysilane composed of [RSi], [R₂Si], and [R''Si] units which contains 0 to 40 mole percent [R₂Si] units, 0.1 to 99.9 mole percent [RSi] units, and 0.1 to 99.9 mole percent [R''Si] units where R is an alkyl radical containing 1 to 8 carbon atoms and where the remaining bonds on silicon are attached to other silicon atoms and chlorine or bromine atoms with an acetylenic Grignard reagent of general formula R'C≡C(CH₂)$_w$MgX' or an acetylenic lithium compound of general formula R'C≡C(CH₂)$_w$Li where w is an integer from 0 to 3, R' is hydrogen, an alkyl radical containing 1 to 6 carbon atoms, a phenyl radical, or an —SiR'''₃ radical wherein R''' is an alkyl radical containing 1 to 4 carbon atoms, and X' is chlorine, bromine, or iodine, at a temperature of 0° to 120° C. and thereafter removing the solvent to obtain the acetylenic polysilane.

This invention also relates to a method of preparing a silicon carbide-containing ceramic article, said method comprising (A) forming an article of the desired shape from an acetylenic polysilane composed of [RSi] and [R₂Si] units in which polysilane there are from 0 to 60 mole percent [R₂Si] units and 40 to 100 mole percent [RSi] units, where R is an alkyl radical containing 1 to 8 carbons atoms and where the remaining bonds on silicon are attached to other silicon atoms and acetylenic groups of the formula —(CH₂)$_w$C≡CR' where w is an integer from 0 to 3 and where R' is hydrogen, an alkyl radical containing 1 to 6 carbon atoms, a phenyl radical, or an —SiR'''₃ group wherein R''' is an alkyl radical containing 1 to 4 carbon atoms; (B) curing the article formed in step (A) so that the article will not melt or fuse during pyrolysis step (C); and (C) heating the cured article of step (B) in an inert atmosphere or in a vacuum to an elevated temperature greater than 800° C. until the polysilane is converted to silicon carbide-containing ceramic article.

This invention also relates to a method of preparing a silicon carbide-containing ceramic article, said method comprising (A) forming an article of the desired shape from an acetylenic polysilane composed of [RSi], [R₂Si], and [R''Si] units in which polysilane there are present 0 to 40 mole percent [R₂Si] units, 0.1 to 99.9 mole percent [RSi] units, and 0.1 to 99.9 mole percent [R''Si] units; where R is an alkyl radical containing 1 to 8 carbon atoms; where R'' is selected from the group consisting of alkyl radicals containing at least six carbona atoms, phenyl radicals, and radicals of the formula A₃Si(CH₂)$_z$— wherein A is selected from the group consisting of hydrogen and alkyl radicals containing 1 to 4 carbon atoms, and z is an integer greater than or equal to 1; and where the remaining bonds on silicon are attached to other silicon atoms and acetylenic groups of the formula —(CH₂)$_w$C≡CR' where w is an integer from 0 to 3 and where R' is hydrogen, an alkyl radical containing 1 to 6 carbon atoms, a phenyl radical, or an —SiR'''₃ radical wherein R''' is an alkyl radical containing 1 to 4 carbon atoms; (B) curing the article formed in step (A) so that the article will not melt or fuse during pyrolysis step (C); and (C) heating the cured article of step (B) in an inert atmosphere or in a vacuum to an elevated temperature greater than 800° C. until the polysilane is converted to silicon carbide-containing ceramic article.

The acetylenic polysilanes of this invention are prepared by reacting a chlorine- or bromine-containing polysilane with either an acetylenic Grignard reagent or an acetylenic lithium compound. The chlorine- or bromine-containing polysilane starting materials useful for preparing the acetylenic polysilanes of this invention may be prepared by reacting a mixture of one or more chlorine- or bromine-containing disilanes with about 0.1 to 10 weight percent of a catalyst at a temperature of about 100° to 340° C. while distilling by-produced volatile materials. This polysilane is composed of [RSi] and [R₂Si] units and contains 0 to 60 mole percent [R₂Si] units and 40 to 100 mole percent [RSi] units where R is an alkyl radical containing 1 to 8 carbon atoms and where the remaining bonds on silicon are attached to other silicon atoms and bromine or chlorine atoms. A preferred polysilane starting material is composed of [CH₃Si] and [(CH₃)₂Si] units and contains 0 to 60 mole percent of [(CH₃)₂Si] units and 40 to 100 mole percent of [CH₃Si] units and where the remaining bonds on silicon are attached to other silicon atoms and chlorine atoms. The procedures of preparing such polysilanes are well known in the art.

Other chlorine- or bromine-containing polysilane starting materials useful for preparing the acetylenic polysilanes of this invention may be prepared by reacting a mixture of one or more chlorine- or bromine-containing disilanes and a monoorganosilane of formula R″SiX₃ with about 0.1 to 10 weight percent of a catalyst at a temperature of about 100° to 340° C. while distilling by-produced volatile materials where R″ is selected from the group consisting of alkyl radicals containing at least six carbon atoms, phenyl radicals, and radicals of the formula A₃Si(CH₂)$_z$— wherein A is selected from the group consisting of hydrogen and alkyl radicals containing 1 to 4 carbon atoms, and z is an integer greater than or equal to 1. This polysilane is composed of (RSi], [R₂Si], and [R″Si] units and contains 0 to 40 mole percent [R₂Si] units, and 0.1 to 99.9 mole percent [RSi] units, and 0.1 to 99.9 mole percent [R″Si] units where R is an alkyl radical containing 1 to 8 carbon atoms; where R″ is selected from the group consisting of alkyl radicals containing at least six carbon atoms, phenyl radicals, and radicals of the formula A₃Si(CH₂)$_z$— wherein A is selected from the group consisting of hydrogen and alkyl radicals containing 1 to 4 carbon atoms, and z is an integer greater than or equal to 1; and where the remaining bonds on silicon are attached to other silicon atoms and chlorine or bromine atoms.

The chlorine- or bromine-containing disilanes useful in preparing the chlorine- or bromine-containing polysilanes are of the general formula

[R$_c$X$_d$Si]₂ where R is an alkyl radical containing from 1 to 8 carbon atoms, c has a value of 0 to 2.5, d has a value of 0.5 to 3, the sum (c+d) equals three, and X is chlorine or bromine. R in the above disilane may be methyl, ethyl, propyl, butyl, pentyl, hexyl, heptyl, or octyl. The disilanes may be either symmetrical or non-symmetrical. Examples of such disilanes include (CH₃)₂ClSiSiCl(CH₃)₂, CH₃Cl₂SiSiCl(CH₃)₂(CH₃)₂BrSiSiBr(CH₃)₂, CH₃Br₂SiSiBr(CH₃)₂ the like. Preferably in the above disilane R is a methyl radical and X is chlorine. The disilane can be prepared from the appropriate silanes or the disilane can be utilized as it is found as a component of the process residue from the direct synthesis of organochlorosilanes. The direct synthesis of organochlorosilanes involves passing the vapor of an organic chloride over heated silicon and a catalyst. See Eaborn, "Organosilicon Compounds," Butterworths Scientific Publications, 1960, page 1. The disilane CH₃Cl₂SiSiCl(CH₃)₂ is found in large quantities in the residue from the reaction and therefore, this Direct Process Residue (DPR) is a good starting material for obtaining the polysilane polymer used in this invention.

Monosilanes may be added to the mixture of disilanes used to prepare the polysilanes useful in this invention. Suitable monoorganosilanes are of formula R″SiX₃ where R″ is selected from the group consisting of alkyl radicals of at least six carbon atoms, phenyl radicals, and radicals of the formula A₃Si(CH₂)$_z$— where A is a hydrogen atom or an alkyl radical containing 1 to 4 carbon atoms, and z is an integer greater than or equal to 1. The A radicals in the formula A₃Si(CH₂)$_z$— may be the same or different. Preferably, z is an integer from 1 to 10 and most preferably, z is an integer equal to 1, 2, or 3. Examples of suitable monoorganosilanes include phenyltrichlorosilane, n-hexyltrichlorosilane, n-octyltrichlorosilane, phenyltribromosilane, n-octyltribromosilane, (CH₃)₃SiCH₂CH₂SiCl₃, H(CH₃)₂SiCH₂CH₂SiCl₃, and the like. Phenyltrichlorosilane and n-octyltrichlorosilane are the preferred monoorganosilanes. The use of such monosilanes is described in more detail in copending U.S. patent application Ser. No. 945,126 filed Dec. 22, 1986 and which is hereby incorporated by reference. Using such monosilanes of the general formula R″SiX₃ in the disilane mixture results in polysilanes composed of [R₂Si], [RSi], and [R″Si] units where R is an alkyl radical containing 1 to 8 carbon atoms and R″ is selected from the group consisting of alkyl radicals of at least six carbon atoms, phenyl radicals, and radicals of the formula A₃Si(CH₂)$_z$— where A is a hydrogen atom or an alkyl radical containing 1 to 4 carbon atoms, and z is an integer greater than or equal to 1, and there are from 0 to 40 mole percent [R₂Si] units, 0.1 to 99.9 mole percent [RSi] units, and 0.1 to 99.9 mole percent [R″Si] units and wherein the remaining bonds on silicon are attached to either other silicon atoms and chlorine atoms or bromine atoms. These are chlorine- or bromine-containing polysilanes where the remaining bonds on silicon are attached to other silicon atoms and chlorine atoms or bromine atoms. Preferably these polysilanes contain from 0 to 40 mole percent [R₂Si] units, 40 to 99 mole percent [RSi] units, and 1 to 30 mole percent [R″Si] units. Most preferably these polysilanes contain from O to 10 mole percent [R₂Si] units, 80 to 99 mole percent [RSi] units, and 1 to 20 mole percent [R″Si] units. The chlorine-containing polysilanes are preferred in the practice of this invention.

In order to prepare the starting chlorine or bromine containing polysilane, the chlorine- or bromine-containing disilanes are reacted in the presence of a rearrangement catalyst. Suitable rearrangement catalysts include ammonium halides, tertiary organic amines, quaternary ammonium halides, quaternary phosphonium halides, hexamethylphosphoramide and silver cyanide. Preferred catalyst includes quaternary ammonium halides having the formula R*₄NX, quaternary phosphonium halides having the formula R*₄PX, and hexamethylphosphoramide where R* is an alkyl radical containing 1 to 6 carbon atoms or a phenyl radical and X is chlorine or bromine.

The amount of catalyst utilized can range from 0.001 to 10 weight percent and preferably from 0.1 to 10 weight percent based on the weight of the starting disilane or disilane mixture or disilane/monoorganolsilane mixture. The catalysts and starting materials require anhydrous conditions and therefore one must take care to insure that moisture is excluded from the reaction system when the disilanes and catalyst are mixed. Generally this can be done by using a stream of dry nitrogen or argon as a cover over the reaction mixture.

The disilane or mixture of disilanes or mixture of disilanes and monoorganosilanes are reacted in the presence of 0.1 to 10 weight percent of a rearrangement catalyst at a temperature of 100° to 340° C. while distilling by-produced volatile materials until there is produced the chlorine- or bromine-containing starting material polysilane of this invention. The order of mixing the reactants is not critical. Preferably the reaction temperature is from 150° to 250° C. Typically the reaction is carried out for about 1 to 48 hours although other time durations may be employed.

The resulting chlorine- or bromine-containing polysilanes are composed of [RSi] and [$R_2$Si] units where there are from 0 to 60 mole percent [$R_2$Si] units and 40 to 100 mole percent [RSi] units, where R is an alkyl radical containing 1 to 8 carbon atoms, and where the remaining bonds on silicon in the polysilane are attached to other silicon atoms and chlorine or bromine atoms or, if a monoorganosilane of general formula R"Si$X_3$ is present with the disilane reaction mixture, the resulting chlorine- or bromine-containing polysilane are composed of [$R_2$Si], [RSi], and [R"Si] units where R is an alkyl radical containing 1 to 8 carbon atoms and R" is selected from the group consisting of alkyl radicals of at least six carbon atoms, phenyl radicals, and radicals of the formula $A_3Si(CH_2)_z$— where A is a hydrogen atom or an alkyl radical containing 1 to 4 carbon atoms, and z is an integer greater than or equal to 1, and there are from 0 to 40 mole percent [$R_2$Si] units, 0.1 to 99.9 mole percent [RSi] units, and 0.1 to 99.9 mole percent [R"Si] units and wherein the remaining bonds on silicon are attached to either other silicon atoms and chlorine atoms or bromine atoms. Typically the chlorine- or bromine-containing polysilane will contain from about 10 to 38 weight percent hydrolyzable chlorine or 21 to 58 weight percent hydrolyzable bromine where the percentages are based on the weight of the polysilane.

As has been described in the prior art, these chlorine- or bromine-containing polysilanes may be pyrolyzed in an inert atmosphere or in a vacuum to obtain a silicon carbide ceramic material. However, the reactivity of the chlorine or bromine makes the handling of these polysilanes difficult. These polysilanes are especially difficult to handle when a low oxygen containing ceramic material is desired. Therefore by the practice of this invention, the chlorine or bromine groups are replaced with acetylenic groups. Further, the incorporation of acetylenic groups in the polysilane allows for novel cure mechanisms and for control of the silicon and carbon stoichiometry of the resulting ceramic material.

The acetylenic polysilanes of this invention may be prepared by reacting the chlorine- or bromine-containing polysilane, under anhydrous conditions, with an acetylenic Grignard reagent of general formula R'C≡C(CH$_2$)$_w$MgX' or with an acetylenic lithium compound of general formula R'C≡C(CH$_2$)$_w$Li where w is an integer from 0 to 3, R' is hydrogen, an alkyl radical containing 1 to 6 carbon atoms, a phenyl radical, or an —SiR'''$_3$ radical wherein R''' is an alkyl radical containing 1 to 4 carbon atoms, and X' is chlorine, bromine, or iodine. Examples of suitable acetylenic groups include —C≡CH, —C≡CCH$_3$, —C≡CCH$_2$CH$_3$, —C≡C(C$_6$H$_5$), —C≡CSi(CH$_3$)$_3$, —CH$_2$C≡CH, —CH$_2$C≡CCH$_3$, —CH$_2$C≡CCH$_2$CH$_3$, —CH$_2$C≡C(C$_6$H$_5$), —CH$_2$C≡CSi(CH$_3$)$_3$, and the like. Preferably, w is equal to zero. Therefore, it is preferred that the acetylenic Grignard reagent is of general formula R'C≡CMgX' and the acetylenic lithium compound is of general formula R'C≡CLi.

The acetylenic Grignard reagents useful in this invention can be prepared by conventional methods. For example, acetylene can be bubbled through a diethylether solution of CH$_3$MgCl; or a substituted acetylene can be reacted with (n-butyl)MgBr or CH$_3$MgCl in diethylether; or the acetylenic halide can be reacted with magnesium in diethylether. These methods are more fully detailed in the Examples which follow this description of the invention. Other methods may be used as will be apparent to those skilled in the art. Typical Grignard reaction solvents can be used herein. Preferred are alkyl ethers and tetrahydrofuran.

The acetylenic lithium compounds can also be prepared by conventional means. For example, a substituted acetylene can be reacted with (n-butyl)Li or CH$_3$Li; or the acetylenic halide can be reacted with lithium in solution. Again, these methods are more fully detailed in the Examples which follow this description of the invention. Other methods may be used as will be apparent to those skilled in the art. Suitable solvents include toluene, xylene, benzene, tetrahydrofuran and ethers.

Combinations of acetylenic Grignard reagents and acetylenic lithium compounds may also be used. Additionally, other Grignard reagents and/or organolithium compounds may also be used in combination with the acetylenic Grignard reagents or acetylenic lithium compounds. Suitable non-acetylenic Grignard reagents are of the general formula $R^{iv}$MgX' where $R^{iv}$ is an alkyl radical of 1 to 8 carbon atoms, a phenyl radical, or a vinyl radical and X' is chlorine, bromine, or iodine. Suitable non-acetylenic organolithium compounds are of the general formula $R^{iv}$Li where $R^{iv}$ is an alkyl radical of 1 to 8 carbon atoms, a phenyl radical, or a vinyl radical. The reaction with the acetylenic and non-acetylenic reagents may be carried out at the same time or the reactions may be sequential. For example, first the chlorine or bromine groups may be partially replaced by acetylenic groups by reaction with less than one equivalent of R'C≡C(CH$_2$)$_w$MgX' per equivalent of chlorine or bromine in the polysilane, followed by reaction with CH$_3$MgX to replace the remaining chlorine or bromine groups with methyl radicals. Or some of the halogen groups may first be replaced by methyl radicals and then the remaining halogen groups replaced by acetylenic groups. However, when R' is hydrogen, the acetylene group must be introduced after the introduction of the non-acetylenic $R^{iv}$ group. Using these techniques and selection of the actual acetylenic groups as well as the relative amounts of the acetylenic and non-acetylenic groups in the polysilane, the stoichiometry of the final ceramic material can be varied over a relatively wide range to produce silicon carbide materials which are silicon or carbon rich. The use of non-acetylenic Grignard reagents or non-acetylenic organolithium compounds results in acetylenic polysilenes where the remaining bonds on silicon are attached to other silicon atoms, acetylenic groups, and $R^{iv}$- radicals.

For best results, dry reaction conditions should be observed when reacting the polysilanes with either Grignard reagents or organolithium compounds. Solvents for the starting chlorine- or bromine-containing polysilane can be any organic solvent in which the material is soluble and which does not react with the polysilane or other reactants except in the desired manner. Examples of useful solvents include toluene, xylene, benzene, tetrahydrofuran, and ethers. Specifically, toluene is preferred. Generally the chlorine- or bromine-containing polysilane is added to the desired amount of the acetylenic Grignard reagent or acetylenic lithium compound, both in a solvent solution. The order of addition is not, however, critical. This addition and reaction is carried out while the materials are stirred or otherwise agitated. The reaction is carried out in a dry inert atmosphere such as in the presence of nitrogen or argon gas to prevent the introduction of water into the reaction vessel. The reaction can be run at temperatures of 0° to 120° C. but preferably the reaction is run at room temperature or slightly below room temperature to prevent or decrease undesirable side reactions. After the addition of the reagent is complete, the reaction mixture is stirred for a time, with or without heating, to ensure the completion of the reaction. Typically the reaction is carried out for a time period of about 1 to 48 hours. Excess Grignard reagent or organolithium compound, if any, is then destroyed using water, HCl, or an alcohol. The reaction mixture is cooled to room temperature and then filtered and dried by conventional means and the solvents and other volatile materials are then removed by stripping under vacuum. The process temperatures should generally be kept below the softening temperature of the polysilane to minimize the possibility of premature polysilane cure. For example, when the acetylenic group is —C≡CH, the temperature should generally be kept below about 200° C.; otherwise the acetylenic polysilane may undergo crosslinking.

It is not necessary to remove all the solvent. Sufficient solvent may be removed to increase the viscosity of the polysilane solution to such levels suitable for dry spinning if fibers are desired. More solvent can be removed if desired. Generally, when fibers are desired, it is preferred that most of the solvent is removed so that a melt spinning technique may be employed. Where most of the solvent is removed the resulting polysilanes are generally solids. The acetylenic-containing polysilanes may still contain some chlorine or bromine but the content of the chlorine or bromine groups is substantial reduced relative to that of the starting chlorine- or bromine-containing polysilane. Residual chlorine or bromine does not appear to affect the usefulness of the acetylenic polysilanes of this invention.

The acetylenic polysilanes of this invention may also have $R^{vi}_2N$-radicals attached to silicon in addition to other silicon atoms and acetylenic groups where $R^{vi}$ is hydrogen, an alkyl radical containing 1 to 4 carbon atoms, a phenyl radical, or a —$SiR^{vii}_3$ radical where $R^{vii}$ is an alkyl radical containing 1 to 4 carbon atoms, a vinyl radical, or a phenyl radical. These $R^{vi}_2N$-radicals may be incorporated by reacting a halogen-containing polysilane, under anhydrous conditions, with an aminolysis reagent of general formula $NHR^{vi}_2$ wherein $R^{vi}$ is hydrogen, an alkyl radical containing 1 to 4 carbon atoms, a phenyl radical, or a —$SiR^{vii}_3$ radical where $R^{vii}$ is an alkyl radical containing 1 to 4 carbon atoms, a vinyl radical, or a phenyl radical. The $R^{vi}_2N$-radicals may be incorporated either before or after the introduction of the acetylenic groups.

The aminolysis reagents useful in this invention are ammonia or substituted or unsubstituted organic amines having the general formula $NHR^{vi}_2$ where $R^{vi}$ is an alkyl radical of 1 to 4 carbon atoms, a phenyl radical, or a —$SiR^{vii}_3$ radical where $R^{vii}$ is an alkyl radical of 1 to 4 carbon atoms, a vinyl radical, or a phenyl radical. Each $R^{vi}$ in the general formula $NHR^{vi}_2$ may be the same radical or they may be different radicals. Examples of such materials include $NH_3$, $CH_3NH_2$, $C_4H_9NH_2$, $(CH_3)_2NH$, and aniline. Most preferred are $CH_3NH_2$, $C_4H_9NH_2$, and aniline. Combinations of these aminolysis reagents may also be employed. If the acetylenic groups are introduced into the polysilane first, the aminolysis reagent may be used in a stoichiometric excess based on the amount of halogen remaining in the polysilane to ensure that the aminolysis reaction is enhanced. Naturally, if the acetylenic groups is to be introduced after the aminolysis reaction the amount of aminolysis reagent used must be less than the stoichiometric amount of replaceable halogen so that the acetylenic groups may be later incorporated. It is generally preferred that the acetylenic groups be introduced before the $R^{vi}_2N$- groups because this reaction order allows for easier control of the relative amounts of the two groups. Excess reagent as well as any solvents and by-products can be stripped or strip distilled at the end of the reaction.

For best results, dry reaction conditions should be observed while introducing the $R^{vi}_2N$-radicals. Solvents for the polysilane can be any organic solvent in which the material is soluble and which does not react with the material except in the desired manner. Examples of useful solents include toluene, xylene, benzene, tetrahydrofuran and ethers. Specifically, toluene is preferred. Generally, the order of addition of the components is not critical, but it has been found preferable to add the neat aminolysis reagent to the halogen-containing polysilane in a solvent solution, such as toluene. This addition and reaction is carried out while the materials are stirred or otherwise agitated. The reaction is carried out in a dry inert atmosphere such as in the presence of nitrogen or argon gas to prevent the introduction of water into the reaction vessel. After the addition of the aminolysis reagent is complete, the reaction mixture is stirred for a time, with or without heating, to ensure the completion of the reaction. Typically the reaction time is about 3 to 96 hours. The reaction can be run at temperatures of 25° to 100° C. but preferably the reaction is run at reflux temperature. The reaction mixture is cooled to room temperature and then filtered by conventional means and the solvents and other volatile materials are then removed by stripping under vacuum with or without the addition of heat. Other separating techniques will be apparent to those skilled in the art. The use of aminolysis reagents results in acetylenic polysilanes where the remaining bonds on silicon are attached to other silicon atoms, acetylenic groups, and $R^{vi}_2N$-radicals.

The acetylenic-containing polysilanes of this invention may be fired in an inert atmosphere or in a vacuum to an elevated temperature of at least 800° C. until a silicon carbide ceramic material is obtained. Preferably the pyrolysis temperature is 1000° C. or higher. Most preferably the pyrolysis temperature is 1000° to 1300° C.

The acetylenic polysilanes may be formed into shaped articles prior to pyrolysis. Fibers are one especially preferred shaped article. Generally, melt spinning techniques for fibers are preferred. However, for HC≡C-containing polysilanes dry spinning techniques are preferred because the polysilane tends to cure at about its melting temperature. In order to prevent the shaped article from melting or fusing during the pyrolysis step, the acetylenic polysilane should be cured for a time sufficient to render the polysilane infusible. What is meant by "infusible" in this specification is that the cured polysilane, when heated rapidly up to the pyrolysis temperature, will not fuse together. A crude screen for infusibility is provided by the solubility of the polysilane in toluene. Prior to any curing treatment the acetylenic polysilanes of this invention are completely or almost completely soluble in toluene. The cured polysilane compositions obtained by the method of this invention are generally either insoluble in toluene or have only limited solubility in toluene.

Several methods can be used to render the acetylenic polysilanes of the present invention infusible. In general, the acetylenic polysilanes of this invention can be cured by the general methods used to polymerize acetylenes. Such polymerization methods useful in this invention generally include UV irradiation and reaction with diborane, transition metal carbonyls, or transition metal carbonyl halides. For example, $(C_6H_5)C{\equiv}C$-containing polysilanes can be rendered infusible by exposure to UV irradiation or to $B_2H_6$ vapor. The $(C_6H_5)C{\equiv}C$- or $(CH_3)_3SiC{\equiv}C$-containing polysilanes can be rendered infusible by exposure to $Co_2(CO)_8$ or UV irradiation with $W(CO)_6$ or $Mo(CO)_6$ in carbon tetrachloride. The time required to rende the acetylenic polysilane composition infusible by the method of this invention will depend, in part, on the size of the acetylenic polysilane article, the temperature of the treatment, the concentration of curing reagent to which the composition is exposed, and the specific acetylenic polysilane employed. The optimum treatment time can be determined by routine experimentation.

In order to minimize the oxygen content of the resulting ceramic article it is preferred that the curing step, as well as other processing steps, be carried out under an inert atmosphere such as argon, nitrogen, helium, and the like.

When the acetylenic polysilane is in the shape of a formed object such as a fiber it is not necessary to render the entire shaped article infusible. Rather only the outer surfaces, and sufficient interior portions directly adjacent to the outer surfaces, need be rendered infusible. The interior portion of the shaped article may be cured during the pyrolysis of the shaped article to elevated temperature. Simply rendering the exterior infusible will prevent the shaped articles from fusing together during the pyrolysis unless a break in the exterior surface occurs which allows the uncured interior to leak out.

When the acetylenic polysilane is in the shape of a formed object such as a fiber, the fiber may be cure with or without tension. The use of tension generally results in fibers without "kinks."

As noted above, the $HC{\equiv}C$-containing polysilane begins to cure at about its melting or softening point. Therefore, this particular polysilane should be particularly useful in the preparation of ceramic composites.

The following examples are intended to illustrate the invention and are not intended to limit the invention.

In the following examples, the analytical methods used were as follows:

Percent chlorine was determined by fusion with sodium peroxide and potentiometric titration with silver nitrate.

The softening temperature was determined on a Thermomechanical Analyzer, Model 1090, from Dupont Instruments.

Carbon, hydrogen, and nitrogen were determined on a C, H, N Elemental Analyzer, Model 240-XA, manufactured by Control Equipment Corporation of Lowell, Mass.

Oxygen was determined using a Leco Oxygen Analyzer equipped with an Oxygen Determinater 316 (Model 783700) and an Electrode Furnace EF100 (Model 77600) manufactured by Leco Corporation, St. Joseph, Mich. The method includes the high temperature carbothermic reduction to CO with CO analysis by IR.

Thermogravimetric analyses (TGA) were carried out on a OmniTherm TGA instrument manufactured by OmniTherm Corporation, Arlington Heights, Ill.

Proton NMR spectra were recorded on a Model EM-390 NMR spectrometer from Varian Associates of Palo Alto, Calif.

Infrared spectra were recorded on a Nicolet Model 5-DX spectrometer from Nicolet Instrument Corp. of Madison, Wis. using thin films cast on NaCl plates.

Molecular weights were determined by gel permeation chromatography using a refractive index detector. Molecular weight measurements were relative to a polystyrene standard.

The polysilanes were fired to elevated temperature using an Astro Industries Furnace 1000A (water cooled graphite heated model 1000.3060-FP-12) or a Lindberg furnace (model 54434).

The physical properties of the ceramic fibers were determined using a Instron Testing Machine Model 1122 from Instron Corporation of Canton, Mass.

Percent silicon was determined by a fusion technique which consisted of converting the silicon material to soluble forms of silicon and then analyzing the soluble material quantitatively for total silicon by atomic absorption spectrometry.

The polysilane used throughout these examples was prepared using the general procedures of U.S. Pat. No. 4,310,472 by reacting a mixture of methylchlorodisilanes and 1.0 weight percent tetra-n-butylphosphonium chloride catalyst under argon while removing volatile byproducts. The methylchlorodisilane used was redistilled direct process residue which contained about 41.8 weight percent $CH_3Cl_2SiSiCl_2CH_3$, 37.7 weight percent $(CH_3)_2ClSiSiCl_2CH_3$, 11.1 weight percent $(CH_3)_2ClSiSiCl(CH_3)_2$, and low boiling silanes. The catalyst was from Alfa Products, Danvers, Mass. The reaction mixture was heated from room tempeture to 250° C. at a rate of 2.0° C./min and held at 250° C. for about 45 minutes under a continuous argon purge. Throughout the heating process volatile byproducts were distilled from the reaction mixture. The brittle, pale-yellow, chlorine-containing polysilane was obtained in about 15 to 20 weight percent yield.

Unless indicated otherwise, all manipulations and process steps were carried out under an inert atmosphere (usually argon or nitrogen). Unless indicated otherwise, all percentages are by weight.

EXAMPLE 1

Phenylacetylene (17.3g, 0.17 moles) was dissolved in 250 ml diethylether at 0° C. under argon. To this stirred solution was added n-butyl lithium (0.17 moles, as a 1.5M solution in hexane). The resulting lithium phenylacetylide solution was allowed to warm to room temperature and then was stirred for about 30 minutes. The chlorine-containing polysilane (30 g, 0.15 moles chlorine) was added after being dissolved in toluene (300 ml). Volatiles were removed by distillation to about 100° C. A saturated, aqueous NH₄Cl solution (50 ml) and then water (50 ml) were added. The organic layer was dried using anhydrous MgSO₄ and then filtered. Solvents were removed by distillation to 175° C. at a pressure of less than 1 mm Hg. A brittle, yellow phenylacetylide-containing polysilane (28 g, 70.0 percent yield) was obtained which contained 38.7 percent silicon, 49.7 percent carbon, 5.6 percent hydrogen, 1.2 percent oxygen, and 1.9 percent chlorine. The polysilane had a softening temperature of 62° C. and a molecular weight of 629 (number average) and 1023 (weight average). Proton NMR confirmed the presence of phenyl radicals in the polysilane (broad signal centered about a delta value of 7.0 ppm); IR confirmed the presence of —C≡C— groups (2151 cm⁻¹, sharp, strong, —C≡C— stretching). The average polysilane molecule contained an estimated 2.5 —C≡CC₆H₅ groups/molecule. A bulk sample of the polysilane was fired to 1200° C. at a rate of about 5.0° C./min under argon. A ceramic product (76 percent char yield) was obtained which contained 45.2 percent silicon, 47.0 percent carbon, 1.7 percent oxygen, and less than 1.0 percent chlorine.

EXAMPLE 2

Trimethylsilylacetylene (16.7 g, 0.17 moles) was dissolved in 250 ml diethylether at 0° C. under argon. To this stirred solution was added n-butyl lithium (0.17 moles, as a 1.5M solution in hexane). The resulting lithium trimethylsilylacetylide solution was allowed to warm to room temperature and then was stirred for about 60 minutes. The chlorine-containing polysilane (30 g, 0.15 moles chlorine) was added after being dissolved in toluene (300 ml). The reaction mixture was worked up as described in Example 1 to obtain a brittle, yellow trimethylsilylacetylide-containing polysilane (29.5 g, 75.2 percent yield) was obtained which contained 50.4 percent silicon, 37.8 percent carbon, 8.2 percent hydrogen, 1.2 percent oxygen, and 2.0 percent chlorine. The polysilane had a softening temperature of 83° C. and a molecular weight of 882 (number average) and 1746 (weight average). Proton NMR confirmed the presence of —Si(CH₃)₃ radicals in the polysilane (sharp signal at a delta value of 0.0 ppm); IR confirmed the presence of —C≡C— groups (2087 cm⁻¹, sharp, strong, —C≡Cstretching). The average polysilane molecule contained an estimated 3.2 —C≡CSi(CH₃)₃ groups/molecule. A bulk sample of the polysilane was fired to 1200° C. at a rate of about 5.0° C./min under argon. A ceramic product (68 percent char yield) was obtained which contained 60.3 percent silicon, 30.7 percent carbon, 1.9 percent oxygen, and 1.4 percent chlorine.

EXAMPLE 3

A saturated acetylene solution was prepared by bubbling acetylene through tetrahydrofuran (150 ml) at 0° C. for 30 minutes under argon. To this stirred solution was added CH₃MgCl (0.24 moles, 3.0M in tetrahydrofuran) over a 90 minute period. The resulting slurry was stirred at 0° C. for 30 minutes under a continuous acetylene purge. The resulting HC≡CMgCl solution was allowed to warm to room temperature and then added to a chlorine-containing polysilane (35 g, 0.24 moles chlorine)/toluene (300 ml) solution at 0° C. The reaction mixture was worked up as described in Example 1 to obtain a brittle, yellow acetylide-containing polysilane (30.5 g, 93.9 percent yield) was obtained which contained 52.9 percent silicon, 34.9 percent carbon, 6.6 percent hydrogen, and 0.3 percent chlorine. The oxygen content was not determined. The polysilane had a softening temperature of 77° C. and a molecular weight of 760 (number average) and 1371 (weight average). IR confirmed the presence of —C≡C—H groups (2074 cm⁻¹, broad, medium, —C≡C— stretching; 3291 cm⁻¹, sharp, medium, ≡C—H stretching). A bulk sample of the polysilane was fired to 1200° C. at a rate of about 5.0° C./min under argon. A ceramic product (89 percent char yield) was obtained which contained 58.6 percent silicon and 33.1 percent carbon. Hydrogen, oxygen, and chlorine were not determined.

EXAMPLE 4

Phenylacetylene (3.6 g, 0.035 moles) was dissolved in 200 ml diethylether at 0° C. under argon. To this stirred solution was added n-butyl lithium (0.03 moles, as a 1.5M solution in hexane). The resulting lithium phenylacetylide solution was allowed to warm to room temperature and then was stirred for about 10 minutes. The chlorine-containing polysilane (31 g, 0.17 moles chlorine) was added after being dissolved in toluene (350 ml). After removing volatiles by distillation to 100° C. the solution was cooled to 0° C. and then methyllithium (0.14 moles, as a 1.2M solution in diethylether) was added. The resulting slurry was warmed to room temperature and then to 100° C. while volatiles were removed by distillation. After cooling to 0° C., the solution was neutralized with saturated, aqueous NH₄Cl (50 ml) and additional water (50 ml). After drying with anhydrous MgSO₄ and filtering, solvents were removed by distillation to 175° C. at less than 1.0 mm Hg. A brittle, yellow phenylactylide- and methyl-containing polysilane (27.7 g, 91.9 percent yield) was obtained which contained 49.8 percent silicon, 36.2 percent carbon, 7.8 percent hydrogen, 1.4 percent oxygen, and 1.4 percent chlorine. The polysilane had a softening temperature of 122° C. and a molecular weight of 811 (number average) and 1341 (weight average). Proton NMR confirmed the presence of phenyl radicals in the polysilane (broad multiplet centered at a delta value of about 7.2 ppm). The average polysilane molecule contained an estimated 1.2 —C≡CC₆H₅ groups/molecule. A bulk sample of the polysilane was fired to 1200° C. at a rate of about 5.0° C./min under argon. A ceramic product (69 percent char yield) was obtained which contained 62.0 percent silicon, 35.1 percent carbon, 0.15 percent hydrogen, and 1.7 percent oxygen. The chlorine content was not determined.

EXAMPLE 5

A methyl-containing polysilane was prepared by reacting the chlorine-containing polysilane (31 g, 0.17 moles chlorine) in 250 ml toluene with methyllithium (0.14 moles, as a 1.5M solution in diethylether) at about 0° C. under argon. Volatiles were removed from this methyl-containing polysilane by distillation to about 100° C. A saturated acetylene solution was then prepared by bubbling acetylene through tetrahydrofuran (100 ml) at 0° C. for 30 minutes under argon. To this stirred acetylene solution was added CH₃MgCl (0.10 moles, 3.0M in tetrahydrofuran) over a 90 minute period. The resulting slurry was stirred at 0° C. for 30 minutes under a continuous acetylene purge. The resulting HC≡CMgCl solution was allowed to warm to room temperature and then added to the just prepared partially methylated polysilane at 0° C. The resulting slurry was warmed to room temperature and then to 100° C. while volatiles were removed by distillation. After cooling to 0° C., the solution was neutralized with saturated, aqueous NH4Cl (50 ml) and additional water (50 ml). After drying with anhydrous MgSO4 and filtering, solvents were removed by distillation to 175° C. at less than 1.0 mm Hg. Based on the reactants used, the resulting polysilane should have about 80 percent of the chlorine groups replaced with methyl radicals and about 20 percent replaced with acetylene groups. A brittle, yellow methyl- and acetylide-containing polysilane (26.7 g, 93.1 percent yield) was obtained which contained 54.6 percent silicon, 32.4 percent carbon, 7.6 percent hydrogen, 1.7 percent oxygen, and less than 1.0 percent chlorine. The polysilane had a softening temperature of 150° C. and a molecular weight of 1019 (number average) and 1497 (weight average). IR confirmed the presence of —C≡C—H groups (2074 cm$^{-1}$, broad, medium, —C≡C— stretching; 3291 cm$^{-1}$, sharp, medium, ° C.-H stretching). A bulk sample of the polysilane was fired to 1000° C. at a rate of about 20° C./min under nitrogen using the TGA instrument; a ceramic product was obtained with a 65 percent char yield.

EXAMPLE 6

An acetylene Grignard reagent was prepared as in Example 3 by reacting a saturated acetylene solution in tetrahydrofuran with CH3MgCl (0.05 moles, as a 1.8M solution in tetrahydrofuran). T6e acetylene Grignard reagent was then reacted with the chlorine-containing polysilane (30 g, 0.15 moles chlorine) as in Example 3. After removing volatiles by distillation at 100° C., the acetylene-containing polysilane was cooled to 0° C. and then reacted with methylamine by bubbling methylamine through the reaction mixture for 30 minutes. The yellow solution was then heated to 100° C. while bubbling argon through the solution to remove any excess methylamine. The reaction mixture was then cooled, filtered, and distilled to 175° C. at less than 1.0 mm Hg to remove the solvent. Based on the reactants used, the resulting polysilane should have about 67 percent of the chlorine groups replaced with —NH(CH3) radicals and about 33 percent replaced with acetylene groups. A brittle, yellow (CH3)NH— and acetylide-containing polysilane (28.9 g, 96.3 percent yield) was obtained which contained 37.2 percent silicon, 24.9 percent carbon, 6.1 percent hydrogen, 2.6 percent oxygen, and 1.0 percent chlorine. Nitrogen was not determined. The polysilane had a molecular weight of 1096 (number average) and 2022 (weight average). IR confirmed the presence of —C≡C—H groups (2031 cm$^{-1}$, sharp, medium, —C≡C— stretching; 3291 cm$^{-1}$, sharp, medium, ≡C—H stretching) and the presence or =NH(CH3) radicals (4308 cm$^{-1}$, sharp, medium, N—H; 1082 cm$^{-1}$, sharp, strong, C—N). A bulk sample of the polysilane was fired to 1000° C. at a rate of about 20° C./min under nitrogen using the TGA instrument; a ceramic product was obtained with a 81 percent char yield.

EXAMPLE 7

This example demonstrates the use of UV irradiation to cure acetylenic polysilane fibers. Samples of several of the polysilanes prepared in earlier examples were powdered with a mortar and pestle and then spun into fibers at various temperatures through a 20 micron spinneret in an inert atmosphere dry box (less than 5 ppm oxygen and less than 10 ppm water). Fiber samples (about 250 mg) were placed in sealed quartz tube under an inert atmosphere and the irradiated with either 254 or 350 nm irradiation for varying times. Rayonet photochemical reactor lamps model numbers RPR2537A (254 nm) and RPR3500A (350 nm) from South New England Ultraviolet Company of Hamden, Conn. were employed. After irradiation the cured fibers were converted to ceramic fibers by pyrolysis to 1200° C. under argon (room temperature to 300° C. at 1.0° C./min, 300 to 1200° C. at 5.0° C./min, and held at 1200° C. for 2 hours). The effectiveness of the UV cure was determined by whether the individual fibers survived the pyrolysis intact. The following results were obtained.

Fibers from the (C6H5)C≡C-containing polysilane prepared in Example 1 were spun at a temperature of 135° C. Fibers cured with either 254 or 350 nm irradiation for 16 hours survived pyrolysis. One sample cured with 254 nm irradiation gave ceramic fibers (48 micron diameter) with an oxygen level of 2.5 weight percent and a tensile strength of 128 Ksi; another fiber sample cured with 254 nm irradiation gave ceramic fibers (11 micron diameter) with an oxygen level of 4.6 weight percent and a tensile strength of 181 Ksi. One sample cured with 350 nm irradiation gave ceramic fibers with an oxygen level of 4.5 weight percent; another fiber sample cured with 254 nm irradiation gave ceramic fibers (11 micron diameter) with an oxygen level of 5.8 weight percent and a tensile strength of 123 Ksi.

Another fiber sample (contained in a quartz tube) was cured using a medium pressure mercury lamp (output in the 220 to 1400 nm range) and an irradiation time of ten minutes; the fibers did not survive pyrolysis to 1200° C. This failure was thought to be due to the approximately 150° C. temperature generated during the irradiation. Therefore the ten minute irradiation was repeated exactly as before except that the fibers were placed in a water cooled quartz tube to better control the temperature; fibers cured under these condition survived pyrolysis to 1200° C.

Fibers from the (CH3)3SiC≡C-containing polysilane prepared in Example 2 were spun at a temperature of 115° C. Fibers cured at 254 nm for 16 hours survived pyrolysis to 1200° C. The resulting ceramic fibers contained 7.4 weight percent oxygen. Fibers cured at 350 nm for 16 hours did not survive pyrolysis to 1200° C.

Fibers from the (C6H5)SiC≡C— and CH3-containing polysilane prepared in Example 4 were spun at a temperature of 190° C. Fibers cured at either 254 nm or 350 nm for 16 hours did not survive pyrolysis to 1200° C.

EXAMPLE 8

This example demonstrates the use of diborane to cure acetylenic polysilane fibers. Fibers were prepared as in Example 7. Fibers were transferred to a quartz boat and then placed in a pyrolysis furnace. The fibers were then exposed to a continuous stream of diborane vapor (2 weight percent in argon) at about 50° to 60° C. for two hours and as the temperature was raised to 200° C. at a rate of 1.0° C./min. When the temperature reached 200° C. the diborane purge was replaced by an argon purge. The fibers were then heated to 1200° C. at a rate of 3.0° C./min and held at 1200° C. for two hours.

Fibers from the (C6H5)C≡C-containing polysilane prepared in Example 1, after the diborane treatment, survived pyrolysis to 1200° C. The ceramic yield was 89.0 weight percent. The resulting ceramic fibers (14 micron diameter) contained 2.0 weight percent oxygen and had a tensile strength of 80 Ksi.

Fibers from the polysilanes prepared in either Example 2 or Example 4 did not survive pyrolysis after the diborane treatment.

EXAMPLE 9

This example demonstrates the use transition metal carbonyls compounds to cure acetylenic polysilane fibers. Fibers were prepared as in Example 7. The fibers and a desired carbonyl compound were placed in an evacuated reaction chamber (about 1mm Hg); the fibers and the carbonyl compound were not in direct contact. The temperature was then raised to sublime the carbonyl compound; generally a temperature of 25° to 40° C. was sufficient. Three different metal carbonyl compounds were employed: $Mo(CO)_6$, $W(CO)_6$, and $Co_2(CO)_8$. Fibers from polysilanes from Examples 1, 2, and 4 were treated with the metal carbonyl compounds for 2 to 5 hours. The treated fibers were then heated from room temperature to 300° C. at 1.0° C./min, 300 to 800° C. at 5.0° C./min and held at 800° C. for one hour. None of the fibers treated with either $Mo(CO)_6$ or $W(CO)_6$ survived pyrolysis to 800° C. However, all three fibers when treated with $Co_2(CO)_8$ survived the 800° C. pyrolysis.

EXAMPLE 10

Attempts to spin fibers using the melt spinning technique of Example 7 with the $HC\equiv C$-containing polysilane of Example 3 were unsuccessful. The polysilane thermally cured at the spinning temperature. A bulk sample of the $HC\equiv C$-containing polysilane was heated to 195° C. for two hours. After this thermal treatment the polysilane was insoluble in toluene indicating that it had thermally cured. Non-heat treated materials are soluble in toluene.

Although melt spinning of the $HC\equiv C$-containing polysilane was not successful, it is expected that fibers could be prepared from this polysilane by using a dry spinning or solvent spinning technique. Fibers thus prepared should be curable by the techniques described.

EXAMPLE 11

This example demonstrates the curing of the acetylenic polysilanes by UV irradiation of a solution of the polysilane and a transition metal carbonyl in carbon tetrachloride. Various acetylenic polysilanes (about 0.25 g) were dissolved in $CCl_4$ along with about 2 weight percent of either $Mo(CO)_6$ or $W(CO)_6$ and then irradiated in a quartz tube for 15 minutes at 60° C. with a medium pressure mercury lamp. Irradiation of a sample of the $(C_6H_5)C\equiv C$-containing polysilane of Example 1 with $W(CO)_6$ in $CCl_4$ resulted in 48 weight percent insoluble material. Irradiation of the $(C_6H_5)C\equiv C$-containing polysilane of Example 1 with $Mo(CO)_6$ in $CCl_4$ or irradiation of the $(CH_3)_3SiC\equiv C$-containing polysilane of Example 2 with either $Mo(CO)_6$ or $W(CO)_6$ gave an insoluble film in the quartz reactor.

That which is claimed:

1. An acetylenic polysilane composed of [RSi] and optional [$R_2Si$] units where there are present 0 to 60 mole percent [$R_2Si$] units and 40 to 100 mole percent [RSi] units, where R is an alkyl radical containing 1 to 8 carbon atoms, and where the remaining bonds on silicon are attached to other silicon atoms and acetylenic groups of the formula $-(CH_2)_wC\equiv CR'$ where w is an integer from 0 to 3 and where R' is hydrogen, an alkyl radical containing 1 to 6 carbon atoms, a phenyl radical, or an $-SiR'''_3$ radical wherein R''' is an alkyl radical containing 1 to 4 carbon atoms.

2. An acetylenic polysilane as defined in claim 1 where w is equal to zero.

3. An acetylenic polysilane as defined in claim 2 where R' is hydrogen.

4. An acetylenic polysilane as defined in claim 2 where R' is an alkyl radical containing 1 to 6 carbon atoms.

5. An acetylenic polysilane as defined in claim 2 where R' is a phenyl radical.

6. An acetylenic polysilane as defined in claim 2 where R' is an $-SiR'''_3$ radical where R''' is an alkyl radical containing 1 to 4 carbon atoms.

7. An acetylenic polysilane as defined in claim 6 where R''' is a methyl radical.

8. An acetylenic polysilane composed of [RSi] and optional [$R_2Si$] units where there are present 0 to 60 mole percent [$R_2Si$] units and 40 to 100 mole percent [RSi] units, where R is an alkyl radical containing 1 to 8 carbon atoms, and where the remaining bonds on silicon are attached to other silicon atoms; acetylenic groups of the formula $-(CH_2)_wC\equiv CR'$ where w is an integer from 0 to 3 and where R' is hydrogen, an alkyl radical containing 1 to 6 carbon atoms, a phenyl radical, or an $-SiR'''_3$ radical wherein R''' is an alkyl radical containing 1 to 4 carbon atoms; and $R^{iv}$ radicals where $R^{iv}$ is an alkyl radical of 1 to 8 carbon atoms, a phenyl radical, or a vinyl radical.

9. An acetylenic polysilane composed of [RSi] and optional [$R_2Si$] units where there are present 0 to 60 mole percent [$R_2Si$] units and 40 to 100 mole percent [RSi] units, where R is an alkyl radical containing 1 to 8 carbon atoms, and where the remaining bonds on silicon are attached to other silicon atoms; acetylenic groups of the formula $-(CH_2)_wC\equiv CR'$ where w is an integer from 0 to 3 and where R' is hydrogen, an alkyl radical containing 1 to 6 carbon atoms, a phenyl radical, or an $-SiR'''_3$ radical wherein R''' is an alkyl radical containing 1 to 4 carbon atoms; and $R^{vi}_2N$-radicals where $R^{vi}$ is an alkyl radical of 1 to 4 carbon atoms, a phenyl radical, or a $-SiR^{vii}_3$ radical where $R^{vii}$ is an alkyl radical of 1 to 4 carbon atoms, a vinyl radical, or a phenyl radical.

10. An acetylenic polysilane composed of [RSi], and [R''Si], and optional [$R_2Si$] units where there are present 0 to 40 mole percent [$R_2Si$] units, 0.1 to 99.9 mole percent [RSi] units, and 0.1 to 99.9 mole percent [R''Si] units; where R is an alkyl radical containing 1 to 8 carbon atoms; where R'' is selected from the group consisting of alkyl radicals containing at least six carbon atoms, phenyl radicals, and radicals of the formula $A_3Si(CH_2)_z-$ wherein A is selected from the group consisting of hydrogen and alkyl radicals containing 1 to 4 carbon atoms, and z is an integer greater than or equal to 1; and where the remaining bonds on silicon are attached to other silicon atoms and acetylenic groups of the formula $-(CH_2)_wC\equiv CR'$ where w is an integer from 0 to 3 and where R' is hydrogen, an alkyl radical containing 1 to 6 carbon atoms, a phenyl radical, or an $-SiR'''_3$ radical wherein R''' is an alkyl radical containing 1 to 4 carbon atoms.

11. An acetylenic polysilane as defined in claim 10 where w is equal to zero.

12. An acetylenic polysilane as defined in claim 11 where there are present 0 to 40 mole percent [$R_2Si$]

units, 40 to 99 mole percent [CH$_3$Si] units, and 1 to 30 mole percent [R"Si] units.

13. An acetylenic polysilane as defined in claim 12 where there are present 0 to 10 mole percent [R$_2$Si] units, 80 to 90 mole percent [CH$_3$Si] units, and 1 to 20 mole percent [R"Si] units.

14. An acetylenic polysilane as defined in claim 12 where R' is hydrogen.

15. An acetylenic polysilane as defined in claim 13 where R' is hydrogen.

16. An acetylenic polysilane as defined in claim 12 where R' is an alkyl radical containing 1 to 6 carbon atoms.

17. An acetylenic polysilane as defined in claim 13 where R' is an alkyl radical containing 1 to 6 carbon atoms.

18. An acetylenic polysilane as defined in claim 12 where R' is a phenyl radical.

19. An acetylenic polysilane as defined in claim 13 where R' is a phenyl radical.

20. An acetylenic polysilane as defined in claim 12 where R' is an —SiR'''$_3$ radical where R''' is an alkyl radical containing 1 to 4 carbon atoms.

21. An acetylenic polysilane as defined in claim 13 where R' is an —SiR'''$_3$ radical where R''' is an alkyl radical containing 1 to 4 carbon atoms.

22. An acetylenic polysilane as defined in claim 20 where R''' is a methyl radical.

23. An acetylenic polysilane as defined in claim 21 where R''' is a methyl radical.

24. An acetylenic polysilane composed of [RSi], [R"Si], and optional [R$_2$Si] units where there are present 0 to 40 mole percent [R$_2$Si] units, 0.1 to 99.9 mole percent [RSi] units, and 0.1 to 99.9 mole percent [R"Si] units; where R is an alkyl radical containing 1 to 8 carbon atoms; where R" is selected from the group consisting of alkyl radicals containing at least six carbon atoms, phenyl radicals, and radicals of the formula A$_3$Si(CH$_2$)$_z$— wherein A is selected from the group consisting of hydrogen and alkyl radicals containing 1 to 4 carbon atoms, and z is an integer greater than or equal to 1; and where the remaining bonds on silicon are attached to other silicon atoms; acetylenic groups of the formula —(CH$_2$)$_w$C≡CR' where w is an integer from 0 to 3 and where R' is hydrogen, an alkyl radical containing 1 to 6 carbon atoms, a phenyl radical, or an —SiR'''$_3$ radical wherein R''' is an alkyl radical containing 1 to 4 carbon atoms; and R$^{iv}$ radicals where R$^{iv}$ is an alkyl radical of 1 to 8 carbon atoms, a phenyl radical, or a vinyl radical.

25. An acetylenic polysilane composed of [RSi], [R"Si], and optional [R$_2$Si] units where there are present 0 to 40 mole percent [R$_2$Si] units, 0.1 to 99.9 mole percent [RSi] units, and 0.1 to 99.9 mole percent [R"Si] units; where R is an alkyl radical containing 1 to 8 carbon atoms; where R" is selected from the group consisting of alkyl radicals containing at least six carbon atoms, phenyl radicals, and radicals of the formula A$_3$Si(CH$_2$)$_z$— wherein A is selected from the group consisting of hydrogen and alkyl radicals containing 1 to 4 carbon atoms, and z is an integer greater than or equal to 1; and where the remaining bonds on silicon are attached to other silicon atoms; acetylenic groups of the formula —(CH$_2$)$_w$C≡CR' where w is an integer from 0 to 3 and where R' is hydrogen, an alkyl radical containing 1 to 6 carbon atoms, a phenyl radical, or an —SiR'''$_3$ radical wherein R''' is an alkyl radical containing 1 to 4 carbon atoms; and R$^{vi}$$_2$N- radicals where R$^{vi}$ is an alkyl radical of 1 to 4 carbon atoms, a phenyl radical, or a —SiR$^{vii}$$_3$ radical where R$^{vii}$ is an alkyl radical of 1 to 4 carbon atoms, a vinyl radical, or a phenyl radical.

26. A method of preparing an acetylenic polysilane composed of [RSi] and optional [R$_2$Si] units which contains from 0 to 60 mole percent [R$_2$Si] units and 40 to 100 mole percent [RSi] units, where R is an alkyl radical containing 1 to 8 carbon atoms and where the remaining bonds on silicon are attached to other silicon atoms and acetylenic groups of the formula —(CH$_2$)$_w$C≡CR' where w is an integer from 0 to 3 and where R' is hydrogen, an alkyl radical containing 1 to 6 carbon atoms, a phenyl radical, or an —SiR'''$_3$ radical wherein R''' is an alkyl radical containing 1 to 4 carbon atoms, said method consisting of reacting under anhydrous conditions in the presence of a solvent a chlorine- or bromine- containing polysilane composed of [RSi] and optional [R$_2$Si] units which contains from 0 to 60 mole percent [R$_2$Si] units and 40 to 100 mole percent [RSi] units, where R is an alkyl radical containing 1 to 8 carbon atoms and where the remaining bonds on silicon are attached to other silicon atoms and chlorine or bromine atoms with an acetylenic Grignard reagent of general formula R'C≡C(CH$_2$)$_w$MgX' or an acetylenic lithium compound of general formula R'C≡C(CH$_2$)$_w$Li where w is an integer from 0 to 3 and where R' is hydrogen, an alkyl radical containing 1 to 6 carbon atoms, a phenyl radical, or an —SiR'''$_3$ radical wherein R''' is an alkyl radical containing 1 to 4 carbon atoms, and X' is chlorine, bromine, or iodine, at a temperature of 0° to 120° C. and thereafter removing the solvent to obtain the acetylenic polysilane.

27. A method as defined in claim 26 where w is equal to zero.

28. A method as defined in claim 27 where the chlorine or bromine containing polysilane is reacted with an acetylenic Grignard reagent.

29. A method as defined in claim 27 where the chlorine or bromine containing polysilane is reacted with an acetylenic lithium compound.

30. A method as defined in claim 27 where the chlorine or bromine containing polysilane is also reacted with an non-acetylenic Grignard reagent of general formula R$^{iv}$MgX' where R$^{iv}$ is an alkyl radical of 1 to 8 carbon atoms, a phenyl radical or a viny radical and X' is chlorine, bromine, or iodine.

31. A method as defined in claim 27 where the chlorine- or bromine-containing polysilane is also reacted with an non-acetylenic lithium compound of general formula R$^{iv}$Li where R$^{iv}$ is an alkyl radical of 1 to 8 carbon atoms, a phenyl radical, or a vinyl radical.

32. A method of preparing an acetylenic polysilane composed of [RSi], [R"Si], and optional [R$_2$Si] units where there are present 0 to 40 mole percent [R$_2$Si] units, 0.1 to 99.9 mole percent [RSi] units, and 0.1 to 99.9 mole percent [R"Si] units; where R is an alkyl radical containing 1 to 8 carbon atoms; where R" is selected from the group consisting of alkyl radicals containing at least six carbon atoms, phenyl radicals, and radicals of the formula A$_3$Si(CH$_2$)$_z$— wherein A is selected from the group consisting of hydrogen and alkyl radicals containing 1 to 4 carbon atoms, and z is an integer greater than or equal to 1; and where the remaining bonds on silicon are attached to other silicon atoms and acetylenic groups of the formula —(CH$_2$)$_w$C≡CR' where w is an integer from 0 to 3 and where R' is hydrogen, an alkyl radical containing 1 to 6 carbon atoms, a phenyl radical, or an —SiR'''$_3$ radical wherein R''' is an alkyl radical containing 1 to 4 carbon atoms, said method consisting of reacting under anhydrous conditions in the presence of a solvent, a chlorine- or bromine- containing polysilane composed of [RSi], [R"Si], and optional [R$_2$Si] units where there are present 0 to 40 mole percent [R$_2$Si] units, 0.1 to 99.9 mole percent [RSi] units, and 0.1 to 99.9 mole percent [R"Si] units; where R is an alkyl radical containing 1 to 8 carbon atoms; where R" is selected from the group consisting of alkyl radicals containing at least six carbon atoms, phenyl radicals, and radicals of the formula A$_3$Si(CH$_2$)$_z$— wherein A is selected from the group consisting of hydrogen and alkyl radicals containing 1 to 4 carbon atoms, and z is an integer greater than or equal to 1; and where the remaining bonds on silicon are attached to other silicon atoms and chlorine or bromine atoms with an acetylenic Grignard reagent of general formula R'C≡C(CH$_2$)$_w$MgX' or an acetylenic lithium compound of general formula R'C≡C(CH$_2$)$_w$Li where w is an integer from 0 to 3 and where R' is hydrogen, an alkyl radical containing 1 to 6 carbon atoms, a phenyl radical, or an —SiR'''$_3$ radical wherein R''' is an alkyl radical containing 1 to 4 carbon atoms, and X' is chlorine, bromine, or iodine, at a temperature of 0 to 120° C. and thereafter removing the solvent to obtain the acetylenic polysilane.

33. A method as defined in claim 32 where w is equal to zero.

34. An acetylenic polysilane as defined in claim 33 where there are present 0 to 40 mole percent [R$_2$Si] units, 40 to 99 mole percent [CH$_3$Si] units, and 1 to 30 mole percent [R"Si] units.

35. An acetylenic polysilane as defined in claim 34 where there are present 0 to 10 mole percent [R$_2$Si] units, 80 to 90 mole percent [CH$_3$Si] units, and 1 to 20 mole percent [R"Si] units.

36. A method as defined in claim 34 where the chlorine- or bromine-containing polysilane is reacted with an acetylenic Grignard reagent.

37. A method as defined in claim 35 where the chlorine- or bromine-containing polysilane is reacted with an acetylenic Grignard reagent.

38. A method as defined in claim 34 where the chlorine- or bromine-containing polysilane is reacted with an acetylenic lithium compound.

39. A method as defined in claim 35 where the chlorine- or bromine-containing polysilane is reacted with an acetylenic lithium compound.

40. A method as defined in claim 34 where the chlorine- or bromine-containing polysilane is also reacted with an non-acetylenic Grignard reagent of general formula R$^{iv}$MgX' where R$^{iv}$ is an alkyl radical of 1 to 8 carbon atoms, a phenyl radical, or a vinyl radical and X' is chlorine, bromine, or iodine.

41. A method as defined in claim 35 where the chlorine- or bromine-containing polysilane is also reacted with an non-acetylenic Grignard reagent of general formula R$^{iv}$MgX' where R$^{iv}$ is an alkyl radical of 1 to 8 carbon atoms, a phenyl radical, or a vinyl radical and X' is chlorine, bromine, or iodine.

42. A method as defined in claim 34 where the chlorine- or bromine-containing polysilane is also reacted with an non-acetylenic lithium compound of general formula R$^{iv}$Li where R$^{iv}$ is an alkyl radical of 1 to 8 carbon atoms, a phenyl radical, or a vinyl radical.

43. A method as defined in claim 35 where the chlorine- or bromine-containing polysilane is also reacted with an non-acetylenic lithium compound of general formula R$^{iv}$Li where R$^{iv}$ is an alkyl radical of 1 to 8 carbon atoms, a phenyl radical, or a vinyl radical.

* * * * *